United States Patent [19]
Sircar

[11] Patent Number: 4,756,723
[45] Date of Patent: Jul. 12, 1988

[54] PREPARATION OF HIGH PURITY OXYGEN

[75] Inventor: Shivaji Sircar, Wescosville, Pa.

[73] Assignee: Air Products and Chemicals, Inc., Allentown, Pa.

[21] Appl. No.: 21,862

[22] Filed: Mar. 4, 1987

[51] Int. Cl.$^4$ .............................................. B01D 53/04
[52] U.S. Cl. ............................................ 55/25; 55/31; 55/33; 55/58; 55/68; 55/74; 55/75
[58] Field of Search ................... 55/25, 26, 31, 33, 35, 55/58, 62, 68, 74, 75

[56] References Cited

U.S. PATENT DOCUMENTS

| | | | |
|---|---|---|---|
| 3,237,377 | 3/1966 | Skarstrom | 55/25 |
| 3,430,418 | 3/1969 | Wagner | 55/25 |
| 3,533,221 | 10/1970 | Tamura | 55/33 |
| 3,564,816 | 2/1971 | Batta | 55/26 |
| 3,594,984 | 7/1971 | Toyama et al. | 55/33 |
| 3,636,679 | 1/1972 | Batta | 55/26 |
| 3,717,974 | 2/1973 | Batta | 55/58 |
| 3,719,025 | 3/1973 | Heinze et al. | 55/31 |
| 3,923,477 | 12/1975 | Armond et al. | 55/25 |
| 4,013,429 | 3/1977 | Sircar et al. | 55/33 |
| 4,065,272 | 12/1977 | Armond | 55/25 |
| 4,280,824 | 7/1981 | Lassmann et al. | 55/33 X |
| 4,329,158 | 5/1982 | Sircar | 55/26 |
| 4,331,455 | 5/1982 | Sato | 55/31 X |
| 4,449,990 | 5/1984 | Tedford, Jr. | 55/26 |
| 4,477,264 | 10/1984 | Kratz et al. | 55/25 |
| 4,519,813 | 5/1985 | Hagiwara et al. | 55/62 X |
| 4,557,736 | 12/1985 | Sircar et al. | 55/62 |
| 4,614,525 | 9/1986 | Reiss | 55/25 |

FOREIGN PATENT DOCUMENTS

| | | | |
|---|---|---|---|
| 152518 | 11/1980 | Japan | 55/26 |
| 2042365 | 9/1980 | United Kingdom | 55/26 |

*Primary Examiner*—Robert Spitzer
*Attorney, Agent, or Firm*—Geoffrey L. Chase; William F. Marsh; James C. Simmons

[57] ABSTRACT

An oxygen-rich gas product of at least about 95% $O_2$ purity is obtained from ambient air in a single-stage pressure swing adsorption operation carried out in four steps, comprised of: (a) selective adsorption of nitrogen from the air feed at superatmospheric pressure, (b) followed, without intermediate purge or rinse, by pressure let down through countercurrent gas withdrawal to about atmospheric level, (c) desorption by evacuation of the adsorbent bed to subatmospheric pressure level of 1/20 (5%) or less than 1/20$^{th}$ of the pressure prevailing during the adsorption step; and (d) repressuring the evacuated bed with part of the oxygen-rich effluent obtained during the adsorption step. Optionally, the operating cycle may include pressure equalization between two columns performed intermediate steps (a) and (b), whereby $O_2$ recovery is increased. Under the prescribed conditions the oxygen production capacity at high purity level (~95%) is substantially increased.

7 Claims, 2 Drawing Sheets

DEPRESSURIZATION
AVERAGE O₂ CONC. = 18.5%

EVACUATION
AVERAGE O₂ CONC. = 10.0%

PREPARATION OF HIGH PURITY OXYGEN

TECHNICAL FIELD

The present invention relates to separation of oxygen from air by pressure swing adsorption (PSA) and is particularly concerned with a process cycle for direct production of essentially nitrogen-free oxygen from ambient air.

BACKGROUND OF THE INVENTION

Numerous prior art patents describe various pressure swing adsorption processes for selective adsorption of nitrogen from ambient air whereby an oxygen-enriched product stream is recovered. While such oxygen enriched air has beneficial use in many diverse applications, essentially nitrogen free oxygen product is needed for some chemical processes, medical, welding and other uses. However, most known PSA processes can efficiently generate only up to about 80-93% $O_2$ product from ambient air because the efficiency of production decreases inordinately when higher purity oxygen product is demanded.

Where oxygen purity of about 95% or higher is desired resort must be had to purchase of liquid oxygen (LOX) or use of cryogenic means for recovery of oxygen from air. These alternatives require in the first instance transportation of the LOX to the site of use, and the latter instance cryogenic generation of the high purity oxygen at the site is often unattractive from an economical standpoint unless the plant size is sufficiently large.

PSA cycles have also been deviced for production of high purity oxygen by two-stage operating techniques whereby an oxygen-rich stream is first produced from ambient air followed by further removal therefrom of remaining nitrogen and argon impurities. Such two-stage operations are cumbersome, however, requiring many adsorbers and complex piping, in addition to which the overall efficiency of separation is quite low.

Among the various prior art patents directed to or disclosing PSA processes for production of oxygen-enriched product gas, only U.S. Pat. No. 3,717,974 contains an example directed to production of a product of 95% $O_2$ purity. Zeolitic adsorbents used for production of oxygen and nitrogen from air selectively adsorb nitrogen from the air feed but do not exhibit any selectivity between oxygen and argon. Consequently, the maximum possible $O_2$ purity that can be achieved by a PSA process is 95.7% $O_2$ (complete nitrogen removal). Thus, while certain of the prior art PSA schemes may be pushed to achieve or approach production from air of a gas product having about 95% $O_2$, such result can be achieved only at the cost of poorer performance. The performance of the PSA process deteriorates as the purity of the oxygen product is increased; both the specific production capacity (in terms of lbs. of product oxygen/lb. of zeolite/cycle), as well as the oxygen recovery, decrease with increase in $O_2$ purity. As a result most PSA processes are designed to product about 85-92% $O_2$ as an optimum product.

Typical PSA multi-column systems for fractionation of ambient air and recovery of an effluent enriched in oxygen and/or in nitrogen are disclosed in U.S. Pat. Nos. 3,923,477; 4,013,429; 4,065,272 and 4,329,158. While certain of these and other patents disclose adsorption of nitrogen from atmospheric air at superatmospheric pressure and vacuum desorption of the nitrogen-laden adsorbent bed, none of these (except the previously noted U.S. Pat. No. 3,717,974) discloses the production of a product having an oxygen content of 95% or above.

Among the several operating modes disclosed in the cited U.S. Pat. No. 3,717,974 the production of a product of ~95% $O_2$ purity is described only in Example 1 of the patent. To obtain the designated high purity $O_2$ product, a nine step process is employed: adsorption, four depressurization steps, followed by a purge at near ambient pressure, then three repressurization steps. The ~95% $O_2$ product is obtained according to the example with a recovery of about 40% and at a production capacity of about 0.035 millipound moles/pound of the adsorbent. At the 70 psia adsorption pressure employed in the patent example the adsorption/desorption pressure ratio is about 4.8.

In accordance with the present invention, as hereinafter described, high purity oxygen product is obtained from atmospheric air at considerably higher yield than heretobefore by a simplified and cost efficient four step PSA operation, including adsorption at a moderate superatmospheric pressure and desorption at a moderate subatmospheric pressure within a prescribed adsorption/desorption pressure ratio.

BRIEF SUMMARY OF THE INVENTION

The present invention provides a novel pressure swing adsorption (PSA) cycle for single stage production of essentially nitrogen-free (~95% $O_2$ + 5.0% $Ar + N_2$) oxygen product directly from ambient air. The key features of the invention are (1) the use of a superatmospheric adsorption step of up to about 8 atmospheres and a subatmospheric desorption step such that the absolute pressure during the adsorption step is at least about 20 times that employed during desorption; and (2) none of the valuable product is consumed for purge cleaning of the adsorbent columns. The high pressure ratio between the adsorption and desorption allows production of oxygen of about 95% purity with good efficiency and the absence of any purge step using product oxygen increases oxygen recovery.

Practice of the invention entails four simple steps: (1) passing the air at superatmospheric pressure through a bed of adsorbent selective in sorbing nitrogen, (2) depressuring the bed to about atmospheric pressure level, (3) evacuation to remove sorbed gas and (4) repressuring with product oxygen to adsorption pressure level.

DETAILED DESCRIPTION OF THE INVENTION

The process cycle according to the invention may be carried out in a multicolumn pressure swing adsorption system operated in parallel, wherein each of the columns, in turn, is on (a) the adsorption step for being charged with ambient air at superatmospheric pressure, followed in sequence by (b) pressure let down through gas withdrawal, (c) evacuation and (d) repressuring with part of the pure product oxygen withdrawn during the adsorption step. Each of the adsorbent columns is packed with a layer of a desiccant 25 at the feed end followed by a layer of molecular sieve zeolite adsorbent preferentially sorbing nitrogen, such as mordenite or type X, Y or A sieves or various cation exchanged forms of these adsorbents using a single or binary combination of cations selected from Groups I and II metals of the Periodic Table. The preferred desiccant is alumina, and the preferred zeolite layer is calcium exchanged molecular sieve A, X or Y.

Figure 1:
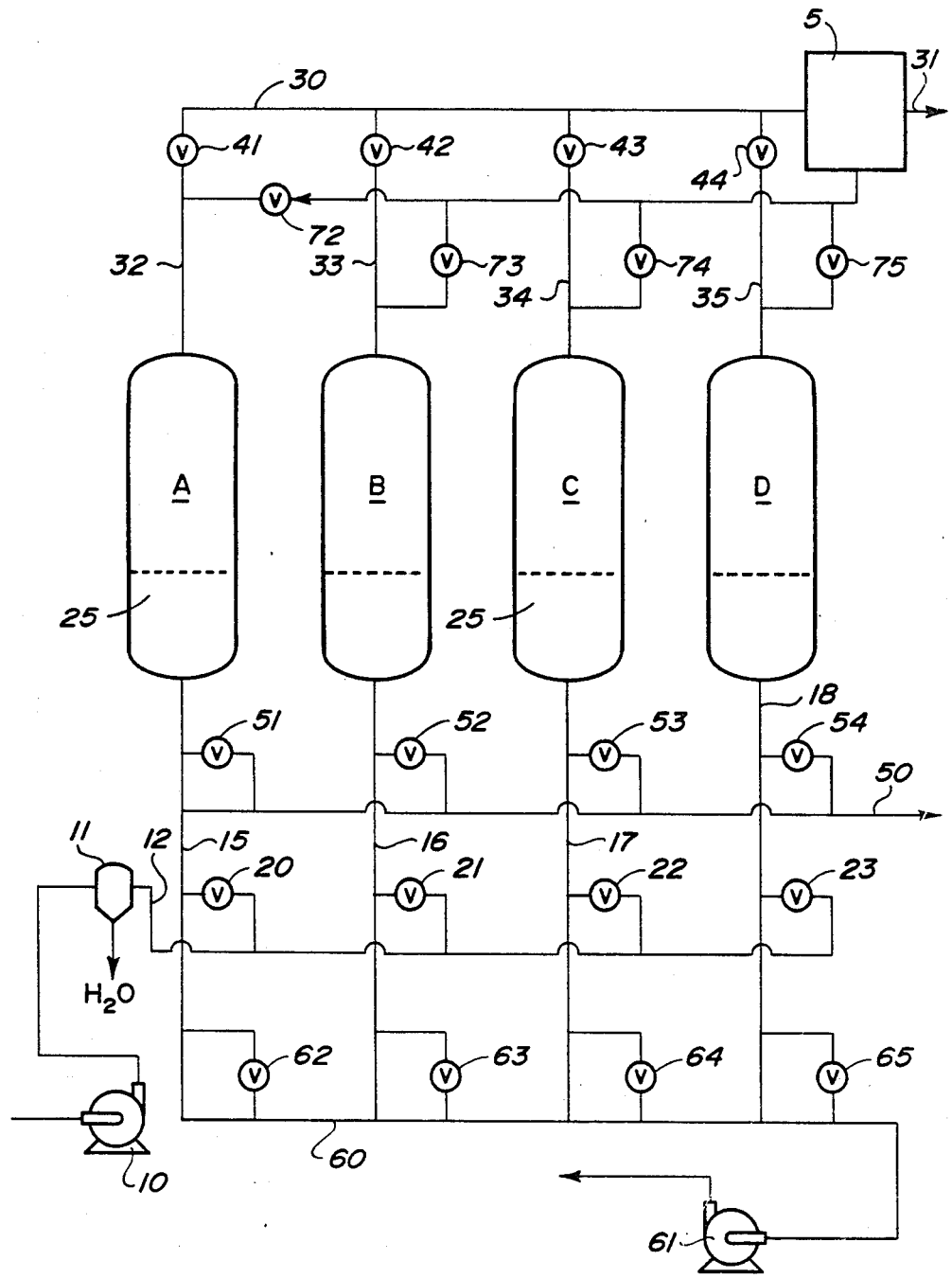
FIG. 1 is a schematic flow diagram illustrating a system adapted for practice of the invention.

To maintain continuity of operation three or four parallel adsorbent columns are needed. A four column system is illustrated in FIG. 1 of the accompanying drawings. The untreated air is compressed to a pressure level of at least about one and a half atmospheres and is introduced, at a temperature in the range of 50° to 120° F., into the then on-stream one of columns A, B, C or D. Assuming that column A is to be charged with the feed, the otherwise untreated ambient air is brought to the desired superatmospheric pressure level by compressor 10 discharging into feed manifold 12, passing into line 15 through open valve 20. The compressed air is cooled to near ambient temperature and any condensate removed in cooler/condenser 11 prior to its discharge into manifold 12. The feed gas entering the adsorbent column passes first through the layer of desiccant 25 and then into and through the succeeding layer of molecular sieve adsorbent in which nitrogen is selectively sorbed and a portion of the less strongly sorbed oxygen (plus argon) is discharged into manifold 30 by line 32 and open valve 41. Line 30 discharges the high purity oxygen into surge receiver 5, from which it may be withdrawn for desired use by line 31. The surge tank may not be needed in certain applications.

At the expiration of a pre-set on-stream time period the adsorption stroke in column A is terminated and the air feed is switched to another of the columns then starting the adsorption step, by opening one of the valves 21, 22, or 23 associated with that column. Each of the columns A through D goes through the same cycle sequence in turn; introduction of feed into columns B, C, D being effected via lines 16, 17, 18 respectively and discharge of unsorbed oxygen effluent into manifold 30 through its connecting line 33, 34 or 35 respectively.

At the termination of the adsorption stroke therein column A is subjected to depressuring by countercurrent withdrawal of gas therefrom into conduit 50 through then opened valve 51. Gas withdrawel is continued until the column on the desorption step is brought to about atmospheric pressure level. When column A is brought to about atmospheric pressure level, valve 51 is closed and evacuation of the column is initiated.

Evacuation of the column is accomplished through vacuum line 60 and vacuum pump 61. Thus, evacuation of column A is effected following the closing of valve 51, by opening valve 62.

During evacuation of column A, and of the companion columns in their turns, the column is brought to a subatmospheric pressure level in the range of 60 to 300 torr, which is at or less than 5% of the absolute pressure level maintained during the adsorption step. By the evacuation most of the sorbed nitrogen and oxygen (and other contaminants that may be present) are removed from the molecular sieve adsorbent layer, as well as the water from the desiccant layer.

The evacuation of column A is terminated by closing valve 62, following which column A is brought back to desired superatmospheric pressure by opening valve 72 for admission of pure oxygen product into the column from storage vessel 5 via supply line 71 or by directly transferring a portion of the $O_2$-enhanced product gas being produced by a companion column then undergoing the high pressure adsorption stroke. When Column A is at the desired superatmospheric pressure level valve 72 is closed and valves 20 and 41 are reopened, for repetition of the described sequence of operational steps beginning with adsorption.

While various time periods can be empirically established for optimum efficiency, it is preferred to employ a system having four adsorption columns, wherein each of the four steps of the recited sequence is carried out for an equal period of time. Conveniently, a four minute cycle may be employed wherein a one minute time period is assigned to each of the steps of (a) adsorption, (b) depressuring, (c) evacuation and (d) repressuring. The operation in each of the four columns in a four minute cycle and the valve positions are tabulated in Table 1.

The initial duration of the adsorption stroke is preset so that the nitrogen in the feed gas continues to be adsorbed, and is terminated short of detrimental breakthrough of nitrogen in the $O_2$ product effluent. The time periods for the recited steps employed in regenerating the absorbent are designed to afford ample time for effluent completion of each of their assigned functions.

TABLE 1

| TIME (min) | COLUMN | | | | VALVE POSITION | | | | | | | | | | | | | | | | | |
|---|---|---|---|---|---|---|---|---|---|---|---|---|---|---|---|---|---|---|---|---|---|---|
| | A | B | C | D | 20 | 21 | 22 | 23 | 41 | 42 | 43 | 44 | 51 | 52 | 53 | 54 | 62 | 63 | 64 | 65 | 72 | 73 | 74 | 75 |
| 0-1 | Ad | Ds | Ev | Rp | o | x | x | x | o | x | x | x | x | o | x | x | x | x | o | x | x | x | x | o |
| 1-2 | Ds | Ev | Rp | Ad | x | x | x | o | x | x | x | o | o | x | x | x | x | o | x | x | x | o | x |
| 2-3 | Ev | Rp | Ad | Ds | x | x | o | x | x | x | o | x | x | x | x | o | o | x | x | x | x | o | x | x |
| 3-4 | Rp | Ad | Ds | Ev | x | o | x | x | x | o | x | x | x | x | o | x | x | x | o | o | x | x | x |

Ad = Adsorption
Ds = Desorption
Ev = Evacuation
Rp = Repressuring
o = open
x = closed As described above, the nitrogen laden column following adsorption is next depressurized by gas withdrawal at the feed inlet end of the column. The gas thus withdrawn is comprised of unadsorbed oxygen (in the voids of the bed) and some co-adsorbed oxygen which, as illustrated in the drawings, is discharged into conduit 50. Instead of wasting the gas so withdrawn it can optionally be employed in the process cycle in partially repressuring a companion column, thus further increasing $O_2$ recovery. Assuming that the adsorption step in column A has been terminated and column D has been evacuated and is ready for repressurization, the gas withdrawn from column A during the countercurrent depressuring of that column, may be introduced into the evacuated column (D) counter to feed direction until the pressure in columns A and D is substantially equalized. Following such pressure equalization, column A is brought to about atmospheric pressure level by continued gas withdrawal, while column D is brought to designed superatmospheric adsorption pressure level with the high purity oxygen from surge vessel 5, or by direct transfer of part of the $O_2$ product from another column as earlier described. Suitable valving and piping needs to be provided in known manner to practice the pressure equalization step.

While the operation illustrated and described is directed to a preferred PSA system having four adsorbent columns operated in parallel, it will be understood that other arrangements may be employed. For further example, the four-step sequence employed in practice of the invention may be carried out in a three column arrangement utilizing a time schedule as shown in Table 2. It is also possible to carry out the cycle sequence of the present invention using only one or two adsorbent columns in conjunction with gas storage tanks.

TABLE 2

| TIME (min.) | COLUMN A | B | C |
|---|---|---|---|
| 0–0.5 | AD | EV | DS |
| 0.5–1.0 | AD | RP | EV |
| 1.0–1.5 | DS | AD | EV |
| 1.5–2.0 | EV | AD | RP |
| 2.0–2.5 | EV | DS | AD |
| 2.5–3.0 | RP | EV | AD |

AD = Adsorption
DS = Desorption
EV = Evacuation
RP = Repressuring

Figure 2A:
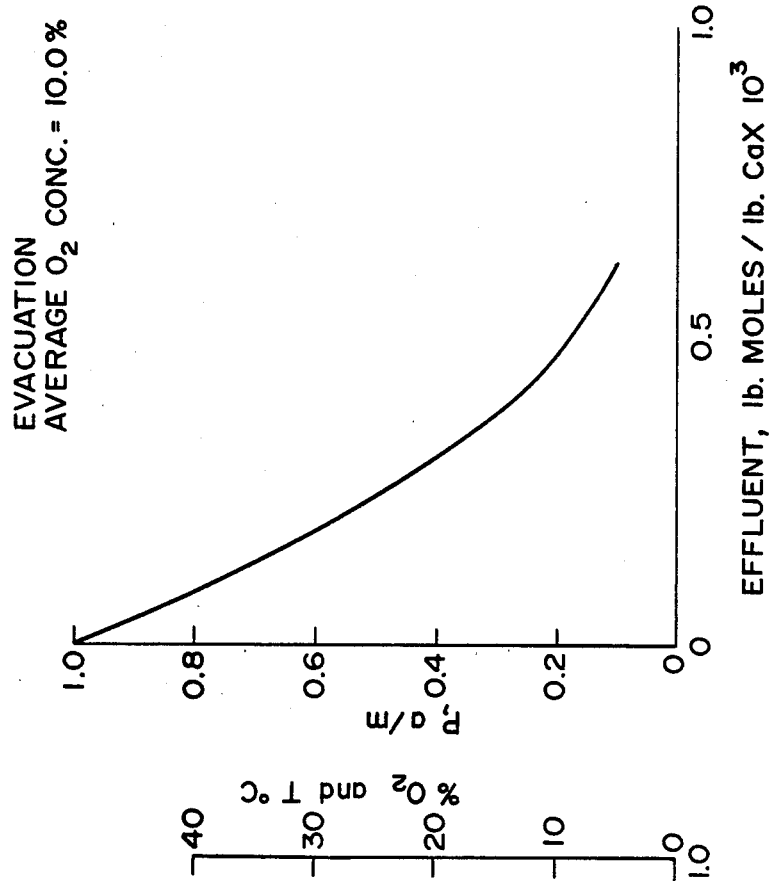
FIG. 2 comprises plots of the midpoint pressures in the adsorption columns and effluent gas composition during (A) depressurization and (B) evacuation, respectively.
Figure 2B:
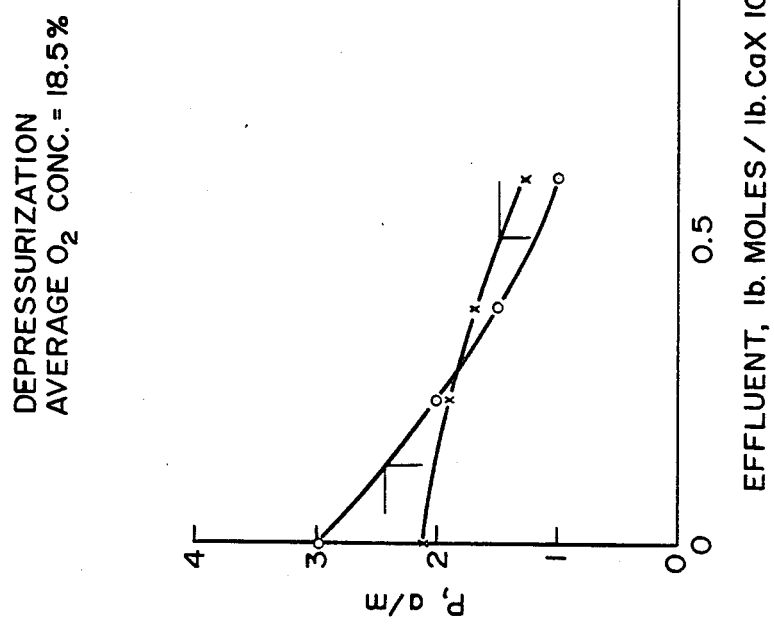

The operation according to the invention was tested by simulated runs using a column packed with a layer of alumina desiccant in the feed air end followed by a layer of calcium X molecular sieve adsorbent. The feed air was continuously passed through the desiccant and adsorbent beds at a pressure of 3 atmospheres, while discharging therefrom a produced primary effluent of enriched air of about 95% $O_2$ at essentially the feed pressure. The beds were depressurized to near ambient pressure level by countercurrent gas withdrawal, and then evacuated to about 75 torr. Repressuring of the evacuated column to 3 atmospheres was carried out employing a synthetic gas mixture composed of 95% $O_2$ and 5% Ar. Steady cyclic state was achieved after about 8–10 cycles. The material balances are tabulated in Table 3. FIG. 2 shows midpoint column pressure and effluent gas composition as functions of desorbed gas quantities, during (A) depressurization and (B) evacuation, respectively. The average $O_2$ concentrations of the depressurized and the evacuated gas from the column are about 18 and 10% (mole), respectively. The average $O_2$ concentration of these two streams is about 14%.

TABLE 3

| IN | | | | OUT | | |
|---|---|---|---|---|---|---|
| % $O_2$ | Total | $O_2$ | | % $O_2$ | Total | $O_2$ |
| Feed Air 21 | 1.31 | 0.275 | Effluent | 95.5 | 0.924 | 0.880 |
| Pressuring Gas 95 | 0.83 | 0.795 | Depressure | 18.5 | 0.602 | 0.113 |
| | | | Evac. | 10.0 | 0.616 | 0.062 |

TABLE 3-continued

| IN | | | OUT | | |
|---|---|---|---|---|---|
| % $O_2$ | Total | $O_2$ | % $O_2$ | Total | $O_2$ |
| | 2.14 | 1.070 | | 2.142 | 1.055 |

Feed Air Rate = 10.0 lb moles/hr/ft$^2$
Feed Air Pres. = 3 atmospheres
Feed Air Temp. = 21° C.
$O_2$ Product 0.094 (95% $O_2$)
$O_2$ Recovery = 34%
{All quantities are expressed in millipound moles/lb of adsorbent}

As seen from the reported results, a large oxygen production capacity (0.094 millipound moles per pound of adsorbent) was obtained at 95% oxygen purity. The comparative numbers at 90% oxygen production level for typical PSA systems are in the order of up to about 0.08 millipound moles/lb. of adsorbent at 50% $O_2$ recovery (U.S. Pat. No. 4,013,429) and about 0.04 millipound moles per pound of adsorbent at 40% $O_2$ recovery (U.S. Pat. No. 4,329,158). The oxygen productivity of the complex PSA process disclosed in U.S. Pat. No. 3,717,974 is only 0.035 millipound moles per pound of adsorbent at 95% $O_2$ purity (40% recovery). Thus, the present invention provides substantially improved $O_2$ production capacity at desired high purity.

What is claimed:

1. The method for producing and recovering from ambient air in a single stage operation an oxygen product of at least 95% purity, which comprises the sequence of steps:

(a) passing the ambient air at superatmospheric pressure of up to about 8 atmospheres, successively through a bed of solid desiccant into and through a second bed in gas flow communication therewith comprised of an adsorbent selective for retention of nitrogen as opposed to oxygen, while discharging from said second bed and collecting as primary effluent an oxygen-rich product substantially freed of nitrogen at substantially the feed gas pressure a portion of which is presently removed from the process as said oxygen product of 95% purity;

(b) at the end of step (a) discontinuing passing of air into said beds and, without further gas introduction therein, reducing the pressure in said beds to about atmospheric level by gas withdrawal in a direction countercurrent to that of step (a) whereby contained gas flows through said adsorbent bed into and through the desiccant bed to discharge therefrom;

(c) following the recited gas withdrawal evacuating said beds to a subatmospheric pressure level which is at or less than 5% of the superatmospheric level obtaining during step (a); and (d) restoring said beds to initial superatmospheric pressure level of step (a) by introducing into said beds oxygen-rich gas including a portion of the primary effluent collected during step (a) and directly thereafter initiating a new cycle in the recited sequence starting with step (a); each of said steps (c) and (d) being carried out to effect gas flow through the beds in a direction concurrent that of step (b).

2. The method as defined in claim 1 wherein said passing of ambient air through said successive beds is carried out at a pressure in the range of 1.5–8 atmospheres.

3. The method as defined in claim 1 wherein said evacuation of said beds is performed at a pressure in the range of 60 to 300 torr.

4. The method as defined in claim 1 wherein said sequence of steps is carried out in each of four such beds of selective adsorbent preceded by solid desiccant in ambient air feed direction, and a substantially equal time period is devoted to each of the defined steps.

5. The method as defined in claim 4 wherein prior to introduction of primary effluent from step (a) into an evacuated bed these beds are brought to an intermediate pressure level by introduction thereinto of gas obtained from a companion bed during the gas withdrawal recited in step (b).

6. The method as defined in claim 1 wherein said desiccant bed comprises alumina and said nitrogen selective adsorbent is a molecular sieve zeolite.

7. The method as defined in claim 1 wherein said desiccant bed and the said nitrogen selective adsorbent are arranged as successive layers in a single column.

* * * * *